(12) United States Patent
Endres

(10) Patent No.: US 11,699,234 B2
(45) Date of Patent: Jul. 11, 2023

(54) SEMANTIC SEGMENTATION GROUND TRUTH CORRECTION WITH SPATIAL TRANSFORMER NETWORKS

(71) Applicant: HERE Global B.V., Eindhoven (NL)

(72) Inventor: Ian Endres, Naperville, IL (US)

(73) Assignee: HERE GLOBAL B.V., Eindhoven (NL)

(*) Notice: Subject to any disclaimer, the term of this patent is extended or adjusted under 35 U.S.C. 154(b) by 398 days.

(21) Appl. No.: 17/110,693

(22) Filed: Dec. 3, 2020

(65) Prior Publication Data
US 2021/0383544 A1 Dec. 9, 2021

Related U.S. Application Data

(60) Provisional application No. 63/033,992, filed on Jun. 3, 2020.

(51) Int. Cl.
G06T 7/10 (2017.01)
G06N 3/08 (2023.01)
G06N 3/047 (2023.01)

(52) U.S. Cl.
CPC .............. *G06T 7/10* (2017.01); *G06N 3/047* (2023.01); *G06N 3/08* (2013.01)

(58) Field of Classification Search
CPC .......... G06T 7/10; G06T 2207/20081; G06T 2207/20084; G06T 7/337; G06N 3/047; G06N 3/08; G06N 3/045
See application file for complete search history.

(56) References Cited

U.S. PATENT DOCUMENTS 10,089,712 B2  10/2018  Misra et al.
2019/0031850 A1  1/2019  Mercx et al.
2019/0251401 A1  8/2019  Schechtman et al.

FOREIGN PATENT DOCUMENTS

CN  107440730 A  * 12/2017  .............. A61B 6/00

OTHER PUBLICATIONS

Lau et al., *Unsupervised 3D End-to-End Medical Image Registration with Volume Tweening Network*, (Research Paper) Feb. 13, 2019 (14 pages).
Girard et al., *Aligning and Updating Cadaster Maps with Aerial Images by Multi-Task, Multi-Resolution Deep Learning*, Asian Conference on Computer Vision (ACCV), Dec. 2018, Perth Australia hal-01923568.

* cited by examiner

*Primary Examiner* — Amandeep Saini
(74) *Attorney, Agent, or Firm* — Jason Wejnert; Here Global B.V.

(57) ABSTRACT

An apparatus accesses label data and training images corresponding to a geographic area; and provides the label data and training images to a training model. The training model comprises of at least a predictor model and an alignment model. The predictor model is configured to receive an image and provide a prediction corresponding to the image. The alignment model is configured to generate a transformed prediction based on aligning the label data and the prediction. The apparatus executes a loss engine to iteratively receive the label data and the transformed prediction, evaluate a loss function based on the label data and the transformed prediction, and cause weights of the predictor model and the alignment model to be updated based on the evaluated loss function to cause the predictor and alignment models to be trained.

20 Claims, 8 Drawing Sheets

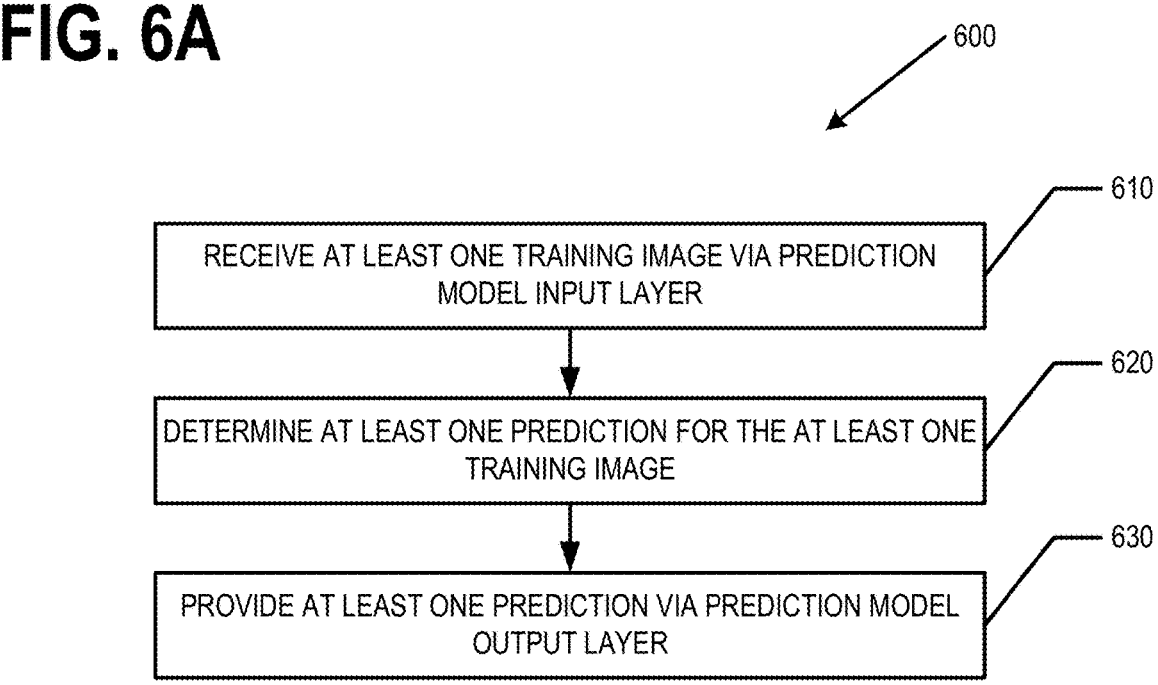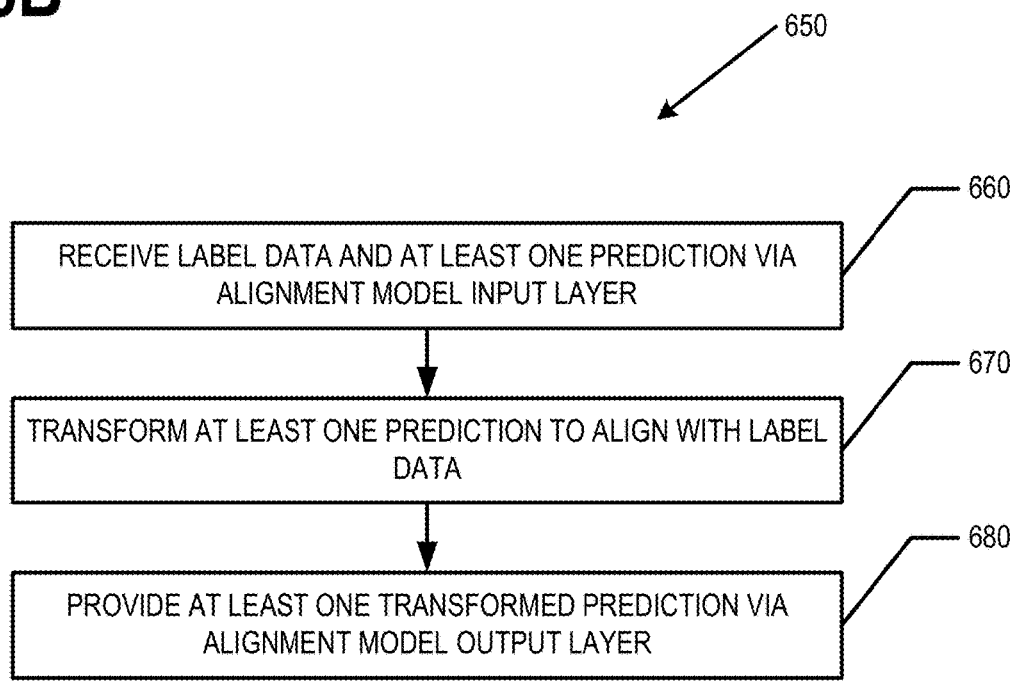

SEMANTIC SEGMENTATION GROUND TRUTH CORRECTION WITH SPATIAL TRANSFORMER NETWORKS

CROSS-REFERENCE TO RELATED APPLICATIONS

This application claims priority to U.S. Application No. 63/033,992, filed Jun. 3, 2020, the content of which is incorporated herein by reference in its entirety.

TECHNICAL FIELD

An example embodiment relates generally to training a predictor model. In particular, an example embodiment generally relates to using machine learning processes to train a segmentation model.

BACKGROUND

Machine learning may be used to train models used to analyze images. For example, supervised machine learning models may be trained to identify objects in images. However, the analysis results generated by a model can only be as accurate as the training information/data used to train the model. For example, training images and label data indicating the location of objects in the training images may be used to train the model. If the label data is not accurate and/or the label data and the training images are slightly misaligned, the accuracy of the resulting model will be reduced. For example, the model may generate blurry predictions.

BRIEF SUMMARY

Methods, apparatus and computer program products are provided in accordance with an example embodiment in order to train a predictor model. In various embodiments, the predictor model is a segmentation model for use in processing optical images, point clouds (e.g., lidar point clouds, radar point clouds, and/or the like). In general, a segmentation model is configured to partition an optical image and/or point cloud (e.g., radar point cloud, lidar point cloud, and/or the like) into multiple segments (e.g., sets of pixels and/or points). For example, segmentation may be used to locate objects and/or boundaries in an optical image and/or point cloud. In various embodiments, a segmentation model is configured to assign a label to each pixel in an optical image and/or point in a point cloud such that pixels and/or points with the same label share certain characteristics. For example, the predictor model may be configured to analyze and/or process an optical image, point cloud, and/or the like and classify and/or segment one or more points and/or pixels within the optical image, point cloud, and/or the like based on features (e.g., buildings, etc.) detected within the optical image, point cloud, and/or the like.

In various embodiments, the predictor model is co-trained with an alignment model. In an example embodiment, the alignment model is a spatial transformer network. Various embodiments use the alignment model during the process of training the predictor model to provide a technical solution to the technical problem of misalignments between training images and label data used to train the predictor model. These misalignments result in a blurring of the results of the predictor model. Thus, various embodiments provide an improved predictor model through an improved predictor model training process and the novel architecture of the training model.

In various embodiments, the predictor model receives training images and analyzes and/or processes the training images to generate a prediction. The alignment model receives the prediction generated by the predictor model and the label data and transforms the prediction such that the transformed prediction is better aligned with the label data. A loss engine evaluates a loss function based on the transformed prediction and the label data and modifies various weights and/or parameters of the predictor model and/or the alignment model based on the evaluation of the loss function. Once the predictor model has been trained, the predictor model is used separate from the remainder of the training model (e.g., independently of the alignment model) to perform optical image and/or point cloud processing functions (e.g., segmentation, point/pixel classification, and/or the like). In an example embodiment, an apparatus (e.g., a model apparatus) accesses label data stored in computer-readable memory and corresponding to a geographic area. The apparatus accesses a plurality of training images corresponding to at least a portion of the geographic area. The apparatus provides the label data and the plurality of training images to a training model. The training model comprises of at least a predictor model and an alignment model. The predictor model is configured to receive at least one image of the plurality of training images and output at least one prediction based on the at least one training image. The alignment model is configured to generate a transformed prediction based on the at least one prediction and the label data. The apparatus causes a loss engine to iteratively receive the label data and the transformed prediction from the alignment model output layer, evaluate a loss function based at least in part on the label data and the transformed prediction, and cause weights of the predictor model and the alignment model to be updated based on the evaluated loss function to cause the predictor model and the alignment model to be trained.

In accordance with an aspect of the present disclosure, a method for training a predictor model is provided. In an example embodiment, the method comprises accessing, by a model apparatus, label data stored in computer-readable memory and corresponding to a geographic area; accessing, by the model apparatus, a plurality of training images corresponding to at least a portion of the geographic area; and providing, by the model apparatus, the label data and the plurality of training images to a training model. The training model comprises of at least a predictor model and an alignment model. The predictor model is configured to receive at least one image of the plurality of training images and output at least one prediction based on the at least one training image. The alignment model is configured to generate a transformed prediction based on the at least one prediction and the label data. The method further comprises causing a loss engine, by the model apparatus, to iteratively receive the label data and the transformed prediction from the alignment model output layer, evaluate a loss function based at least in part on the label data and the transformed prediction, and cause weights of the predictor model and the alignment model to be updated based on the evaluated loss function to cause the predictor model and the alignment model to be trained.

In an example embodiment, the predictor model is a segmentation model. In an example embodiment, the predictor model is at least one of (a) a residual network (ResNet) or (b) fully convolution network (FCN). In an example embodiment, the predictor model is a 34-layer residual network. In an example embodiment, the label data is at least one of (a) map data, (b) building footprints associated with a ground truth location, or (c) a two-dimensional or three-dimensional model of a geographic area. In an example embodiment, the alignment model is a spatial transformer network. In an example embodiment, after completion of training, the predictor model is used independently of the alignment model. In an example embodiment, the alignment model transforms the prediction using at least one of translation, rotation, an affine transformation, a projective transformation, a dense pixel transformation, or a scaling transformation. In an example embodiment, the prediction is at least one of a probability map or an edge image.

In accordance with another aspect of the present disclosure, an apparatus configured to train a predictor model is provided. In an example embodiment, the apparatus comprises at least one processor and at least one memory storing computer program code. The at least one memory and the computer program code are configured to, with the processor, cause the apparatus to at least access label data stored in computer-readable memory and corresponding to a geographic area; access a plurality of training images corresponding to at least a portion of the geographic area; and provide the label data and the plurality of training images to an input layer of a training model. The training model comprises of at least a predictor model and an alignment model. The predictor model is configured to receive at least one image of the plurality of training images and output at least one prediction via a prediction model output layer. The alignment model is configured to generate a transformed prediction based on the at least one prediction and the label data. The at least one memory and the computer program code are further configured to, with the processor, cause the apparatus to at least cause a loss engine, by the model apparatus, to iteratively receive the label data and the transformed prediction from the alignment model output layer, evaluate a loss function based at least in part on the label data and the transformed prediction, and cause weights of the predictor model and the alignment model to be updated based on the evaluated loss function to cause the predictor model and the alignment model to be trained.

In an example embodiment, the predictor model is a segmentation model. In an example embodiment, the predictor model is at least one of (a) a residual network (ResNet) or (b) fully convolution network (FCN). In an example embodiment, the predictor model is a 34-layer residual network. In an example embodiment, the label data is at least one of (a) map data, (b) building footprints associated with a ground truth location, or (c) a two-dimensional or three-dimensional model of a geographic area. In an example embodiment, the alignment model is a spatial transformer network. In an example embodiment, after completion of training, the predictor model is used independently of the alignment model. In an example embodiment, the alignment model transforms the prediction using at least one of translation, rotation, an affine transformation, a projective transformation, a dense pixel transformation, or a scaling transformation. In an example embodiment, the prediction is at least one of a probability map or an edge image.

In accordance with yet another aspect, a computer program product is provided that comprises at least one non-transitory computer-readable storage medium having computer-executable program code instructions stored therein. The computer-executable program code instructions comprise program code instructions configured to, when executed by a processor of an apparatus, cause the apparatus to access label data stored in computer-readable memory and corresponding to a geographic area; access a plurality of training images corresponding to at least a portion of the geographic area; and provide the label data and the plurality of training images to an input layer of a training model. The training model comprises of at least a predictor model and an alignment model. The predictor model is configured to receive at least one image of the plurality of training images and output at least one prediction via a prediction model output layer. The alignment model is configured to generate a transformed prediction based on the at least one prediction and the label data. The computer-executable program code instructions further comprise program code instructions configured to, when executed by a processor of the apparatus, cause the apparatus to cause a loss engine, by the model apparatus, to iteratively receive the label data and the transformed prediction from the alignment model output layer, evaluate a loss function based at least in part on the label data and the transformed prediction, and cause weights of the predictor model and the alignment model to be updated based on the evaluated loss function to cause the predictor model and the alignment model to be trained.

In an example embodiment, the predictor model is a segmentation model. In an example embodiment, the predictor model is at least one of (a) a residual network (ResNet) or (b) fully convolution network (FCN). In an example embodiment, the predictor model is a 34-layer residual network. In an example embodiment, the label data is at least one of (a) map data, (b) building footprints associated with a ground truth location, or (c) a two-dimensional or three-dimensional model of a geographic area. In an example embodiment, the alignment model is a spatial transformer network. In an example embodiment, after completion of training, the predictor model is used independently of the alignment model. In an example embodiment, the alignment model transforms the prediction using at least one of translation, rotation, an affine transformation, a projective transformation, a dense pixel transformation, or a scaling transformation. In an example embodiment, the prediction is at least one of a probability map or an edge image.

In accordance with yet another aspect of the present disclosure, an apparatus is provided that comprises means for accessing label data stored in computer-readable memory and corresponding to a geographic area. The apparatus comprises means for accessing a plurality of training images corresponding to at least a portion of the geographic area. The apparatus comprises means for providing the label data and the plurality of training images to an input layer of a training model. The training model comprises of at least a predictor model and an alignment model. The predictor model is configured to receive at least one image of the plurality of training images and output at least one prediction via a prediction model output layer. The alignment model is configured to generate a transformed prediction based on the at least one prediction and the label data. The apparatus comprises means for causing a loss engine to iteratively receive the label data and the transformed prediction from the alignment model output layer, evaluate a loss function based at least in part on the label data and the transformed prediction, and cause weights of the predictor model and the alignment model to be updated based on the evaluated loss function to cause the predictor model and the alignment model to be trained.

BRIEF DESCRIPTION OF THE DRAWINGS

Figure 1:
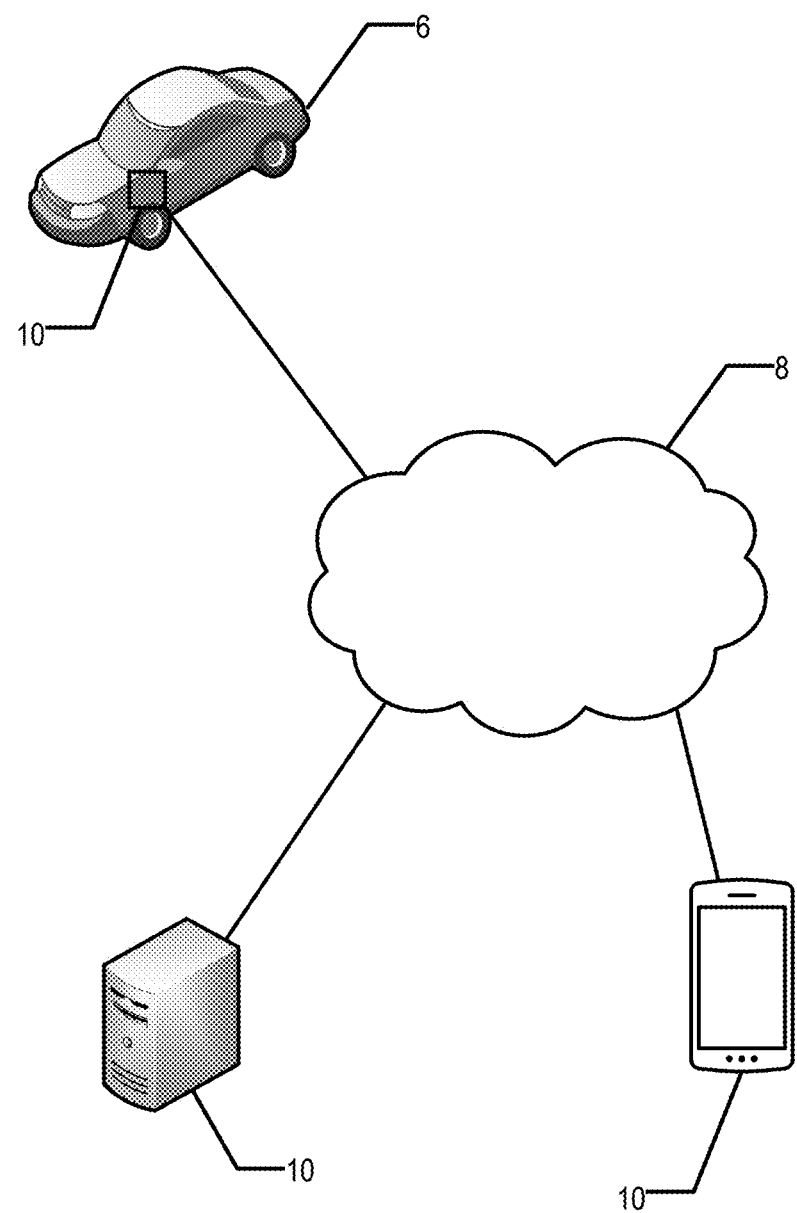
Figure 2A:
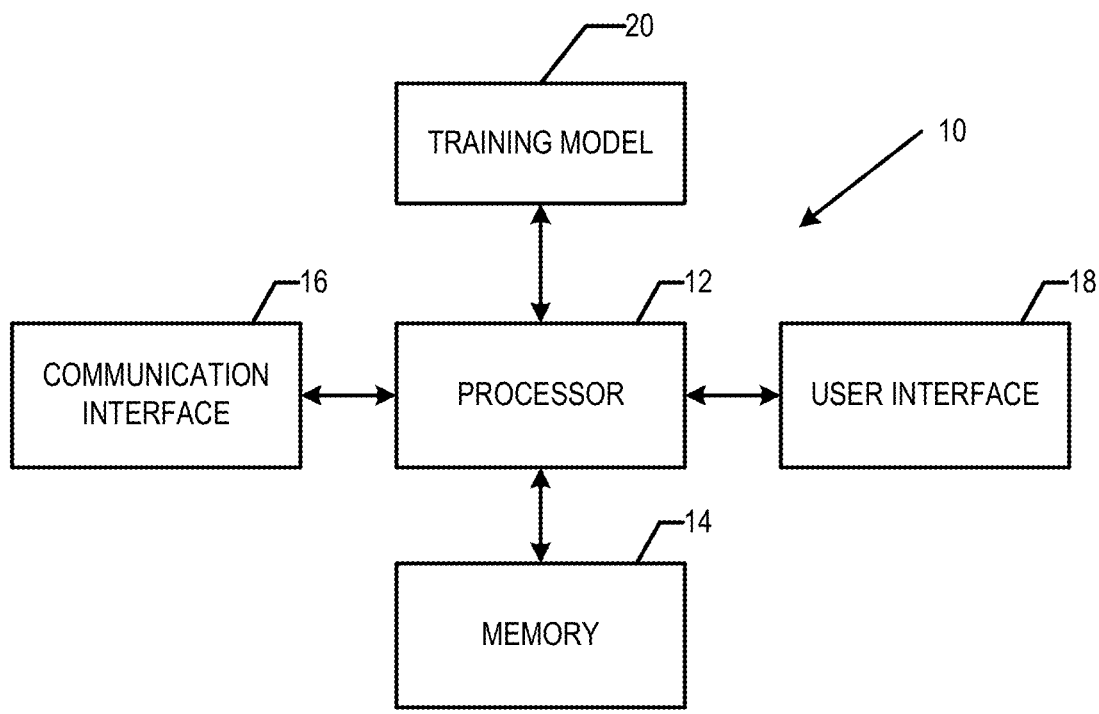
Figure 2B:
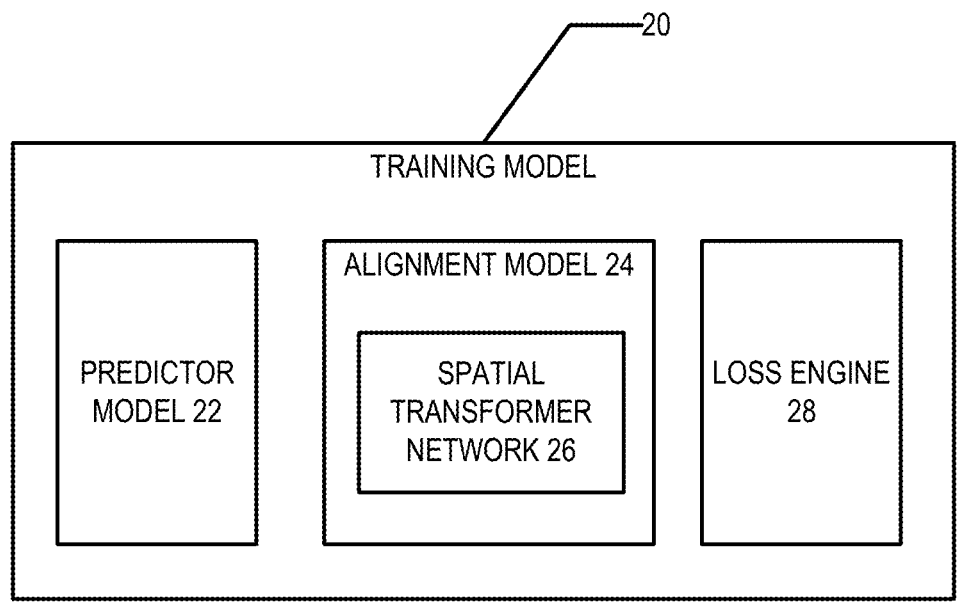
Figure 3:
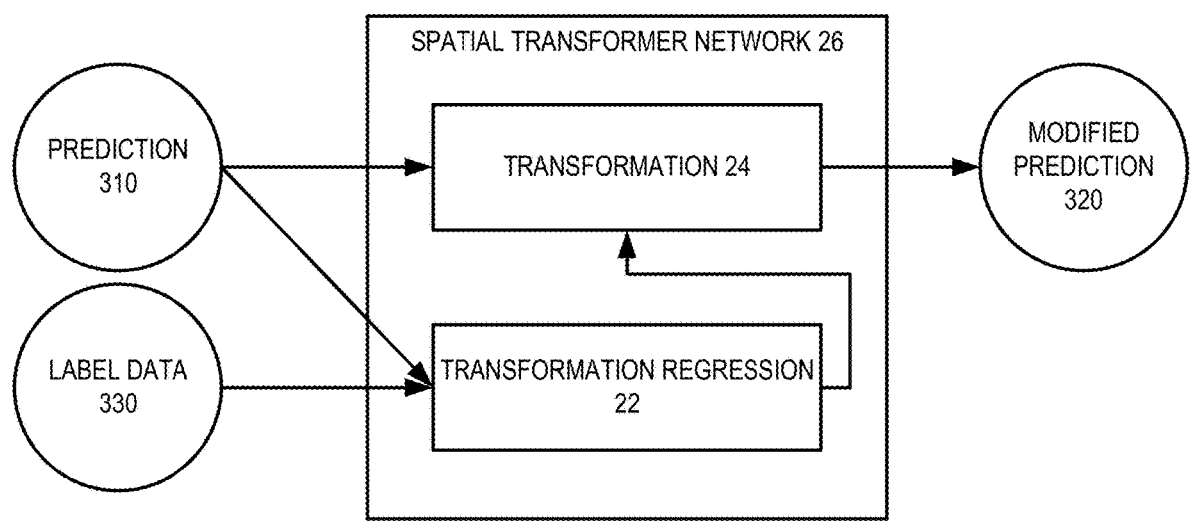
Figure 4:
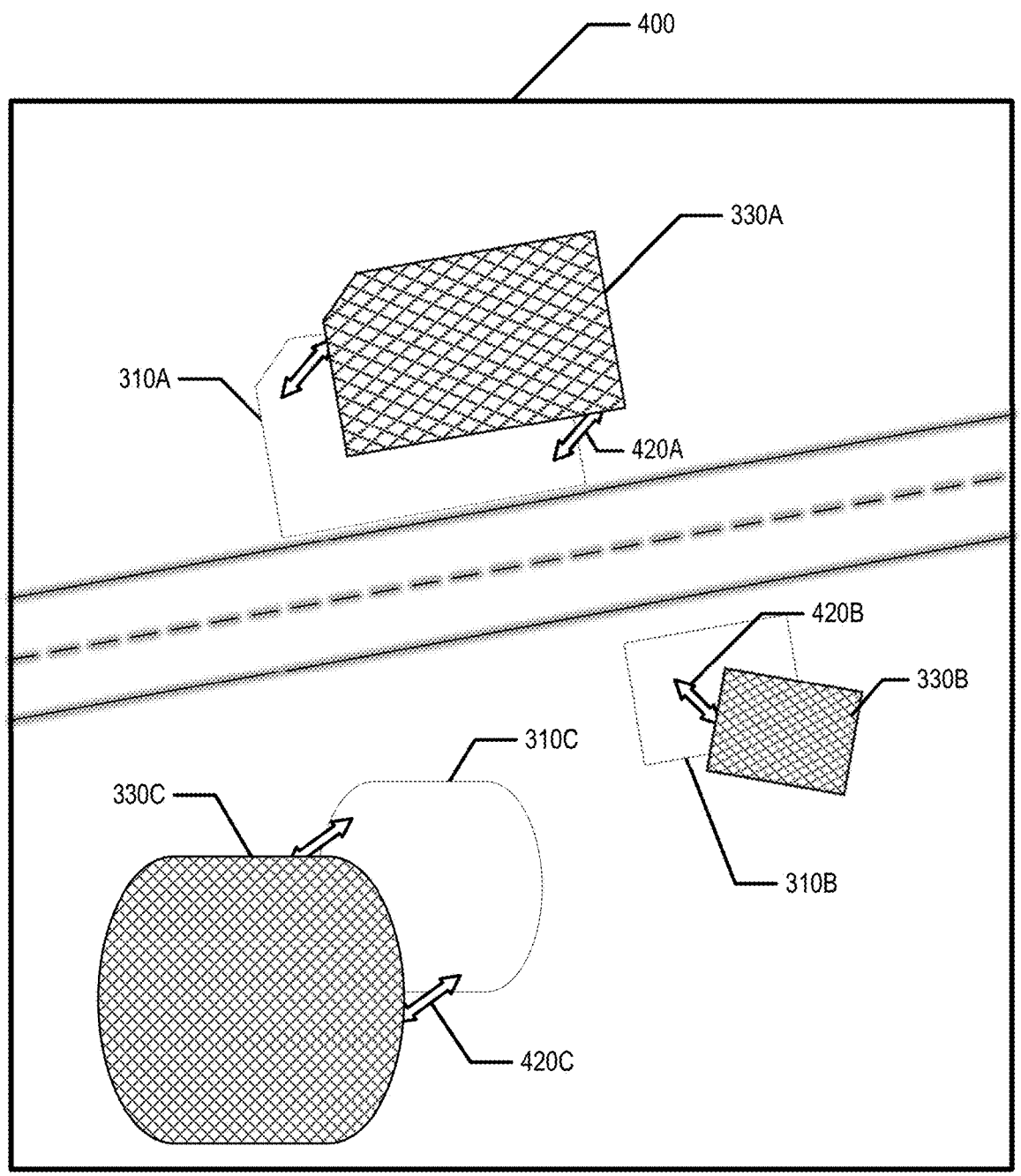
Figure 5:
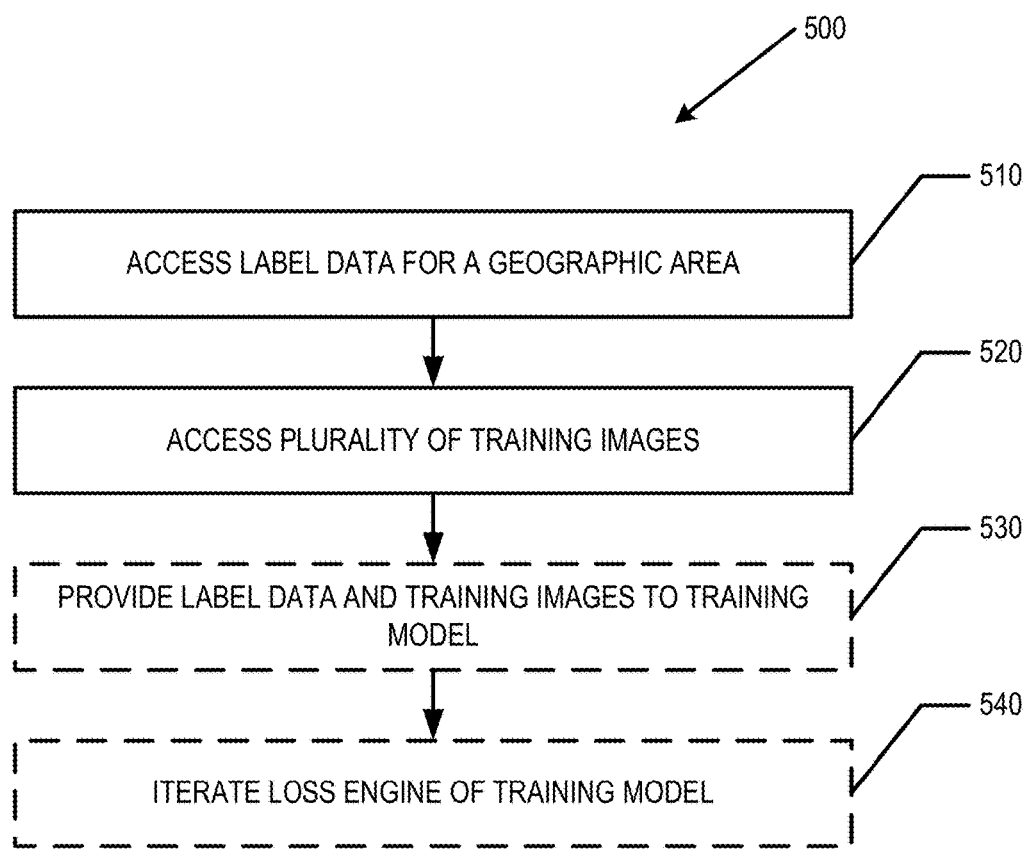
Figure 7:
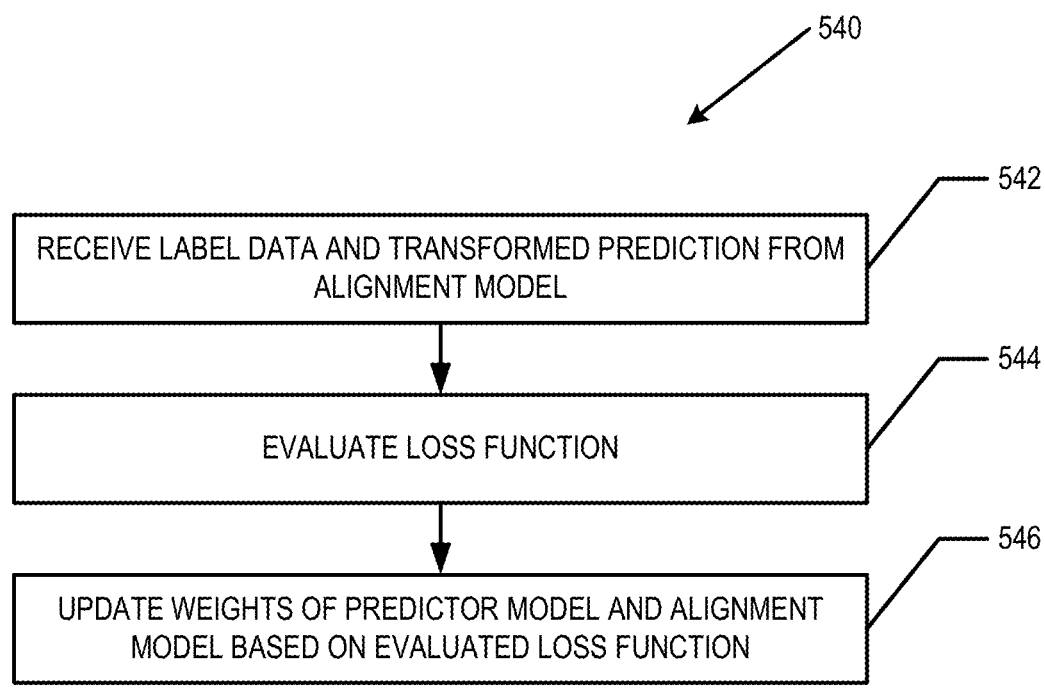
Figure 8A:
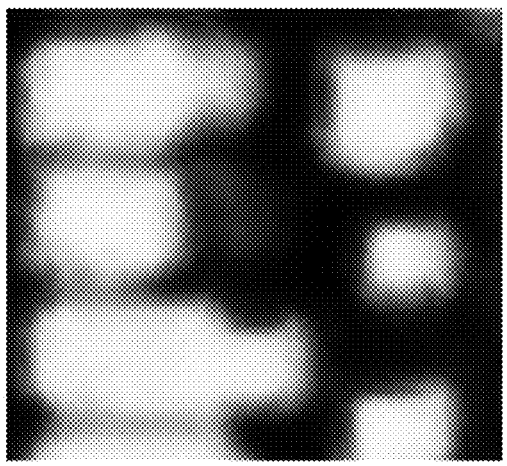
Figure 8B:
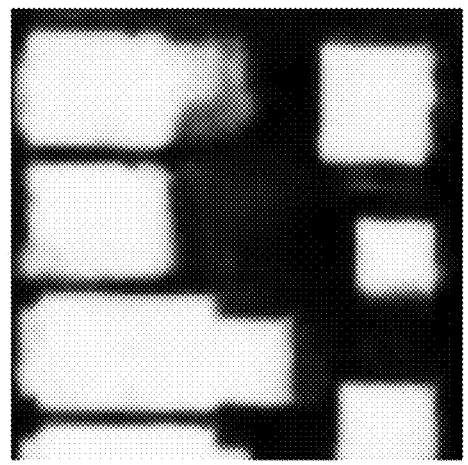

Having thus described certain example embodiments in general terms, reference will hereinafter be made to the accompanying drawings, which are not necessarily drawn to scale, and wherein:

FIG. 1 is a block diagram showing an example system of one embodiment of the present disclosure;

FIG. 2A is a block diagram of a model apparatus that may be specifically configured in accordance with an example embodiment;

FIG. 2B is a block diagram of a training model within a model apparatus that may be specifically configured in accordance with an example embodiment;

FIG. 3 is a block diagram illustrating operations performed, such as by the model apparatus of FIG. 2A, in accordance with an example embodiment;

FIG. 4 is a diagram illustrating an example of aligning a prediction with label data, in accordance with an example embodiment;

FIG. 5 is a flowchart illustrating operations performed, such as by the model apparatus of FIG. 2A, in accordance with an example embodiment;

FIG. 6A is a flowchart illustrating operations performed, such as by the model apparatus of FIG. 2A, in accordance with an example embodiment;

FIG. 6B is a flowchart illustrating operations performed, such as by the model apparatus of FIG. 2A, in accordance with an example embodiment;

FIG. 7 is a flowchart illustrating operations performed, such as by the model apparatus of FIG. 2A, in accordance with an example embodiment;

FIG. 8A is showing an example prediction output resulting from operations performed prior to the use of an alignment model;

FIG. 8B is showing an example prediction output resulting from operations performed, such as by an alignment model in accordance with an example embodiment;

DETAILED DESCRIPTION

Some embodiments will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus and computer program products are provided in accordance with an example embodiment in order to train a predictor model. In various embodiments, the predictor model is a segmentation model for use in processing optical images, point clouds (e.g., lidar point clouds, radar point clouds, and/or the like). In general, a segmentation model is configured to partition an optical image and/or point cloud (e.g., radar point cloud, lidar point cloud, and/or the like) into multiple segments (e.g., sets of pixels and/or points). For example, segmentation may be used to locate objects and/or boundaries in an optical image and/or point cloud. In various embodiments, a segmentation model is configured to assign a label to each pixel in an optical image and/or point in a point cloud such that pixels and/or points with the same label share certain characteristics. For example, the predictor model may be configured to analyze and/or process an optical image, point cloud, and/or the like and classify and/or segment one or more points and/or pixels within the optical image, point cloud, and/or the like based on features (e.g., buildings, etc.) detected within the optical image, point cloud, and/or the like.

In various embodiments, the predictor model is co-trained with an alignment model. In an example embodiment, the alignment model is a spatial transformer network. Various embodiments use the alignment model during the process of training the predictor model to provide a technical solution to the technical problem of misalignments between training images and label data used to train the predictor model. These misalignments result in a blurring of the results of the predictor model. Thus, various embodiments provide an improved predictor model through an improved predictor model training process and the novel architecture of the training model.

In various embodiments, the predictor model receives training images and analyzes and/or processes the training images to generate a prediction. The alignment model receives the prediction generated by the predictor model and the label data and transforms the prediction such that the transformed prediction is better aligned with the label data. A loss engine evaluates a loss function based on the transformed prediction and the label data and modifies various weights and/or parameters of the predictor model and/or the alignment model based on the evaluation of the loss function. Once the predictor model has been trained, the predictor model is used separate from the remainder of the training model (e.g., independently of the alignment model) to perform optical image and/or point cloud processing functions (e.g., segmentation, point/pixel classification, and/or the like).

FIG. 1 provides an illustration of an example system that can be used in conjunction with various embodiments of the present disclosure. As shown in FIG. 1, the system may include one or more model apparatuses 10. In various embodiments, the model apparatus 10 may be a server or server system, in vehicle navigation system, vehicle control system, a mobile computing device, and/or the like. In an example embodiment, the model apparatus 10 may be a in vehicle navigation system co-located or located within a vehicle 6.

In an example embodiment, a model apparatus 10 may comprise components similar to those shown in the example model apparatus 10 diagrammed in FIG. 2A. In an example embodiment, the model apparatus 10 is configured to access label data and a plurality of training images for training a predictor model. In an example embodiment, as shown in FIG. 2A, the model apparatus 10 may comprise a processor 12, memory 14, a communications interface 16, a user interface 18, a training model 20, and/or other components configured to perform various operations, procedures, functions or the like described herein. In at least some example embodiments, the memory 14 is non-transitory and may store information/data corresponding to label data and/or a plurality of training images. The memory 14 may further store information/data and/or instructions for training a predictor model by determining at least one prediction corresponding to at least one training image and aligning the prediction with label data.

In various example embodiments, the communication interface 16 may allow the model apparatus 10 to be in electronic communication with other model apparatuses 10 over a network 8 as shown in FIG. 1. A network 8 may be a wired or wireless Personal Area Network (PAN), Local Area Network (LAN), Metropolitan Area Network (MAN), Wide Area Network (WAN), Wi-Fi, Bluetooth Low Energy (BLE), cellular network, and/or the like. In some embodiments, a network 8 may comprise the automotive cloud, digital transportation infrastructure (DTI), radio data system (RDS)/high definition (HD) radio or other digital radio system, and/or the like. A network 8 may allow shared computer processing resources and data between any number of model apparatuses 10 connected thereto. For example, a model apparatus 10 may be configured to receive label data and/or a plurality of training images through the network 8 from another model apparatus 10. In an alternative embodiment, a predictor model 22 and an alignment model 24 may be implemented in different processors 12 or even different model apparatuses 10.

In an example embodiment, as shown in FIG. 2A, the model apparatus 10 may comprise a training model 20. In some example embodiments, the training model 20 may be a machine learning module or a neural network. For example, the training model 20 may be an implementation of supervised machine learning and/or unsupervised machine learning. In various embodiments, training model 20 includes various machine learning layers such as an input layer, any number of hidden layers, and an output layer. FIG. 2B highlights various components of the training model 20. For example, training model 20 may comprise a predictor model 22, an alignment model 24, and/or a loss engine 28. In various embodiments, the predictor model 22 may implement machine learning and comprise at least an input layer, a hidden layer, and an output layer. In certain embodiments, the alignment model 24 may also implement machine learning and comprise at least its own input layer, hidden layer, and output layer. Similarly, the loss engine 28 may comprise of any number of layers and implement machine learning. For example, the predictor model 22 may be configured to receive a plurality of training images via its own input layer, determine a prediction corresponding to a training image in any number of hidden layers, and provide the prediction via its own output layer. For example, the alignment model 24 may be configured to receive label data and a prediction via its own input layer, determine a transformation and transform the prediction via its own hidden layer(s), and provide the transformed prediction via its own output layer. For example, the loss engine 28 may be configured to receive label data and the transformed prediction, evaluate a loss function, and update weights and/or various parameters belonging to the predictor model 22 and/or the alignment model 24 based on the result of evaluating the loss function.

In an example embodiment, the predictor model 22 may be and/or comprise of a segmentation model. In an example embodiment, the predictor model 22 may be and/or comprise at least one of (a) a residual network (ResNet) or (b) a fully convolution network (FCN). In an example embodiment, the predictor model 22 may be and/or comprise of a 34-layer residual network (e.g. ResNet 34). In an example embodiment, the alignment model 24 may be and/or comprise a spatial transformer network 26. In various embodiments, the predictor model 22 may be used independently of the alignment model 24 if the predictor model 24 has been fully trained as a result of the loss engine 28 fully optimizing the weights of the predictor model 22 and the alignment model 24.

II. Example Operation

In various scenarios, optical images, point clouds, and/or the like may be processed and/or analyzed to identify features within the optical images, point clouds, and/or the like and/or to partition the pixels and/or points of the optical images, point clouds, and/or the like into segments of pixels and/or points having common attributes. This segmentation of the optical images, point clouds, and/or the like may be performed by a predictor model 22. For example, the predictor model 22 may be a segmentation model. Traditional techniques and training architectures for predictor models may result in fuzzy and/or blurred predictions due to misalignments between training images and label data used to train the predictor model 22.

Various embodiments provide improved techniques and training architectures for training a predictor model 22. For example, the training model 20 comprises an alignment model 24. The alignment model 24 is trained along with the predictor model 22. For example, the alignment model may receive a prediction generated by the predictor model 22 and label data and generate a transformed prediction that is used to evaluate a loss function. The evaluation of the loss function is then used to update weights and/or parameters of the predictor model 22 and/or alignment model 24 (e.g., to train the predictor model 22 and/or alignment model 24).

FIG. 3 diagrams an example operation of the present disclosure, specifically the processing done within the training model 20. As previously mentioned, and shown in FIG. 2B, the training model 20 may comprise of at least an alignment model 24, which may in turn be and/or comprise of a spatial transformer network 26, illustrated now in FIG. 3. The spatial transformer network 26 may receive at least one prediction 310 and label data 330 as inputs. In various embodiments, the prediction 310 may be a segmentation prediction, specifically a segmentation of an optical image, a point cloud, and/or the like. In example embodiments, the prediction 310 may be in the form of a probability map and/or an edge image. For example, the prediction 310 may be a segmentation of a satellite image for the purpose of identifying features in a geographic area and/or creating a feature map. In various example embodiments, the label data 330 may be a ground truth accessed from 2D and/or 3D map database that contains footprints of buildings and/or other features and their precise locations and/or configurations. The spatial transformer network 26 may further comprise of at least two tasks, those two being transformation regression 22 and transformation 24. Finally, the spatial transformer network 26 may output a modified prediction 320, where a modified prediction 320 may be a segmentation prediction of the same type as the initial prediction 310. For example, if the initial inputted prediction 310 is a segmentation of a point cloud, then the outputted modified prediction 320 may also be a segmentation of a point cloud.

The transformation regression 22 performed by the spatial transformer network 26 may determine a transformation with which to modify the prediction 310. FIG. 3 illustrates the prediction 310 as being an input to the transformation regression 22 task specifically. Upon receiving the prediction 310 as input, the transformation regression 22 task may determine some spatial transformation to apply to that same segmentation prediction 310. Examples of these spatial transformations that may be applied may include translations in the x-axis (left and right) and/or the y-axis (up and down). Transformation regression 22 may also be configured to determine a translation in a z-axis and/or any additional number of dimensions up to the number of dimensions present in the initial inputted prediction 310. In various example embodiments, transformation regression 22 may further determine an additional variety of spatial transformations including rotations in a number of axes, affine transformations, projective transformations, dense pixel transformations, and/or scaling transformations. This initial spatial transformation may be determined by the transformation regression 22 task by a variety of factors. For example, this initial spatial transformation may be determined based on an image capture source angle, where a satellite may be imaging a geographic area at an angle not normal to the geographic area. Statistical methods may also be implemented in various example embodiments by the transformation regression 22 task to determine a spatial transformation.

The transformation regression 22 task may also receive label data 330 as another input. In certain embodiments where the prediction 310 may be a segmentation of a satellite image of a geographical area, the label data 330 may be a ground truth from an independent map data set consisting of building footprints and/or data generated from another independent set of satellite sources. Receiving this label data 330 as input may allow the transformation regression 22 task to better determine a transformation by which to improve the prediction 310. The label data 330 may modify the initial spatial transformation determined based initially only on the initial inputted prediction 310. For example, the transformation regression 22 task receives both a segmentation prediction 310 of a segmented feature positioned at the bottom left corner of an image and label data 330 showing the ground truth of the same feature positioned at the top right corner of an image. Due to the feature positioning in the label data 330 ground truth, the transformation regression 22 task may determine a translation towards the right and up by which to modify the segmentation prediction 310. In another example, the transformation regression 22 task receives a segmentation prediction 310 first and determines an initial spatial translation to the right based on some factors. The transformation regression 22 task then receives the label data 330 ground truth featuring the same segmented feature positioned at the top right corner, causing the transformation regression 22 task to modify the initial spatial translation to be a translation to the right and upwards. In a further example, the transformation regression 22 task may receive a segmentation prediction 310 containing a segmented building footprint that is 15 pixels wide due to blurriness. The transformation regression 22 task may also receive a label data 330 ground truth for that specific building that accurately shows the building footprint to be 10 pixels wide. The transformation regression 22 task then determines a transformation that may include scaling, affine transformation, projective transformation, and/or dense pixel transformation that reduces the segmented building footprint in the segmentation prediction 310 from 15 pixels wide to 10 pixels wide as well as any blurriness. Therefore as seen in at least these examples, the transformation regression 22 task attempts to maximize the agreement between the prediction 310 and the label data 330 with some transformation for the prediction 310. In various embodiments, the transformation regression 22 task may determine one overall transformation for the entire prediction 310. In certain other embodiments, the transformation regression 22 task may determine an individual transformation for each individual feature of the prediction 310. In an example embodiment, the transformation regression 22 task determines transformations using a loss function and/or per-pixel regression.

The transformation 24 task as illustrated by FIG. 3 may receive two inputs. The transformation 24 task may be pipelined directly after the transformation regression 22 task so that the transformation 24 may receive the transformation determined by the transformation regression 22. The transformation 24 task may also receive the original prediction 310 as input in order to apply the determined transformation. For example, if the determined transformation is a translation to the right and up, then the transformation 24 task will then translate the prediction 310 towards the right and up. In another example, if the determined transformation is an affine transformation for one feature in the prediction 310 and a scaling transformation for another feature, then the transformation 24 task may apply such transformations to their respective features. The transformation 24 task may be configured to perform transformations on the segmentation prediction 310 by any number of methods, such as a pixel-by-pixel/pointwise translation, an n-dimensional affine transformation matrix, transformation of a sampling grid, convolutional translation, filtering, and/or the like. By performing the determined transformation on the prediction 310, the transformation 24 task may result in a modified prediction 320 as an output. It should be clear that the modified prediction 320 should more closely resemble and/or align with the label data 330 than the original prediction 310 as a result of the transformation regression 22 task using the label data 330 to determine a transformation.

Reference is now made to FIG. 4. FIG. 4 illustrates an example embodiment featuring a segmentation prediction image 400. The segmentation prediction image 400 may be an output of a predictor model 22 output layer and may be a segmentation prediction for a training image. In this example embodiment, the training image may be a two-dimensional satellite image of a geographic area, and the segmentation prediction image 400 may be the result of a predictor model 22 attempting to segment the satellite image and identify features in the geographic area. In various embodiments, the training image may be blurred or fuzzy due to some factors which may include natural low resolution of satellite imagery, weather conditions, inconsistent light reflection, and/or the like. As a result, the segmentation prediction image 400 may also be blurred or fuzzy with unclear segmentation boundaries. The training image may also have misaligned and/or mispositioned features for some other factors such as a satellite being in an unoptimal position or orientation, thus resulting in the segmentation prediction image 400 to also have misaligned or misplaced segmented features. In various embodiments, misalignment of a feature in the segmentation prediction image 400 may include a feature being rotated in the x-axis and/or y-axis (and/or z-axis if three-dimensional), translated in the x-axis and/or y-axis (and/or z-axis), and/or scaled by any factor, etc. It is appreciated that many other types of misalignments or imperfections in general may be present in the segmentation prediction image 400.

The segmentation prediction image 400 may include segmentation predictions 310 for features in the captured geographic area. For example, building segmentation 310A may be a segmentation prediction for a building featured in the training image that the segmentation prediction image 400 was derived from. Building segmentation 310A may be an example of a segmentation prediction 310 in FIG. 3 which is provided as input to an alignment model 24 and its spatial transformer network 26. In another example embodiment, segmentation prediction image 400 as a whole may be a segmentation prediction 310 provided as input to the alignment model 24 and its spatial transformer network 26. For example, the segmentation prediction 310 may be a probability map generated by the predictor model 22 and/or an edge image generated by the predictor model 22. In an example embodiment, a probability map is a map of a geographic area having for each point and/or each pixel therein an associated probability that indicates the probability that the point and/or pixel is associated with a particular class, object, feature, and/or the like. In an example embodiment, an edge image is an image of the geographic area comprising predicted outlines and/or edges of objects, features, and/or the like in the image. The segmentation prediction image 400 is an example of an edge image, according to an example embodiment. The segmentation prediction image 400 in FIG. 4 also illustrates building segmentations 310B and 310C. Building segmentations 310A-C may be blurred, fuzzy, misaligned, and/or misplaced as a result of a variety of factors, perhaps associated with inaccuracies or imperfections of the initial capturing of the training image and/or untrained behavior of the predictor model 22.

FIG. 4 also illustrates label data 330, or ground truths. For example, FIG. 4 shows building label data 330A, which is a ground truth or building footprint of the same corresponding building from which building segmentation 310A is determined from. In example embodiments, building label data 330A is a building footprint that was more accurately captured and/or is known to be accurate in terms of alignment, position, and/or scaling. Building footprints may be more precise and "high-resolution" with less or no blurring and/or fuzziness. For example, building label data 330A may be extracted from an established map database or existing map data. In another example, the building label data 330A may be generated from image data captured by another imaging source (e.g., satellite) that has already been processed and associated with ground truth location information/data. For example, label data 330 may be and/or derived from previous modified predictions 320 from past executions of the present disclosure. FIG. 4 also presently includes building label data 330B and 330C, respectively corresponding to building segmentations 310B and 310C.

The building segmentations 310A-C shown in FIG. 4 are demonstrated to be blurry, misaligned, mispositioned, and/or mis-scaled as compared to building label data 330A-C respectively. For example, building segmentation 310A appears to be translated in a left and downwards direction from building label data 330A, which is a ground truth of where the building actually is positioned in the geographic area. For example, building label data 330A may be a ground truth of building positioning in terms of distance relative to other features. In another example, building segmentation 310B appears to be translated in a left and upwards direction from building label data 330B, as well as appearing to be rotated in a counter-clockwise direction. For another example, building segmentation 310C appears to be scaled down in size from building label data 330C, in addition to being translated in a right and upwards direction. These examples illustrated by FIG. 4 are a subset of all possible combinations of misalignments, mispositionings, and mis-scalings and are not intended to be limiting embodiments.

The alignment model 24 and its spatial transformer network 26 in the training model 20 may improve the predictions 310 shown in the segmentation prediction image 400 in FIG. 4. The alignment model 24 may perform processing to align the segmentation prediction image 400, or each building segmentation prediction 310 individually, with the label data 330 ground truth, a more accurate representation of features in the geographic area. As discussed in the context of FIG. 3, the misalignments, mispositionings, and/or mis-scalings of building segmentation predictions 310A-C may be transformed to improve the alignment or agreement between the building segmentation predictions 310A-C and the building label data 330A-C. In an example embodiment, the alignment model 24 may transform the segmentation prediction image 400 as a whole to optimize an averaged alignment across all segmented features. In various other example embodiments, the alignment model 24 may individually transform segmented features to optimize individual alignments. For example, the alignment model 24 may individually transform building segmentation prediction 310A to better align with building label data 330A using a transformation 420A, involving a translation to the right and upwards. As a result of the transformation 420A, the segmentation prediction image 400 may then be updated to have a modified segmentation prediction 320A (not shown) more closely resembling the alignment, position, and/or scaling of building label data 330A. FIG. 4 illustrates further examples of transformations performed by the present invention, such as transformations 420B and 420C. For example, transformation 420B may involve a rotation of building segmentation prediction 310B in the clockwise direction, as well as a translation to the right and downwards. For example, transformation 420C may comprise of a positive scaling of building segmentation prediction 310C and a translation to the left and downwards. Transformations 420A-C may also improve the blurriness of the building segmentation predictions 310A-C and involve the use of other transformations such as affine transformations, projective transformations, and/or dense pixel transformations. Therefore, as a result of processing done by the alignment model 24, the segmentation prediction image 400 may be composed of modified predictions 320A-C, which are transformations of the original segmentation predictions 310. In another example embodiment, the segmentation prediction image 400 containing the transformed predictions may be considered a modified prediction 320 as a whole.

Referring now to FIG. 5, a flowchart is provided to illustrate a method 500 by which a model apparatus 10 may train a predictor model. Starting at block 510, label data for a geographic area is accessed. The label data 330 described in FIG. 3 and illustrated in FIG. 4 may be an example of this accessed label data. In an example embodiment, label data for a geographic area may be stored in and/or accessed from a memory 14 of a model apparatus 10. In another example embodiment, label data for a geographic area may be received by a communication interface 16 of a model apparatus 10 from another model apparatus 10 through a network 8. In a further example embodiment, label data for a geographic area may be inputted by a user through a user interface 18 of a model apparatus 10. It will be appreciated that label data for a geographic area is overall in some way accessible to a model apparatus 10 through any of, but not limited to, the aforementioned mediums. Thus, a model apparatus may comprise means, such as processor 12, memory 14, communications interface 16, user interface 18, and/or the like, for accessing label data for a geographic area. As discussed previously in regards to FIGS. 3 and 4, label data for a geographic area may be known as ground truth data and may be considered to be an accurate representation of the geographic area and/or features within the geographic area specifically. This label data for a geographic area may originate from an independent map information/data set including features (ex: building footprints) and/or data generated from an independent set of satellite sources. In certain example embodiments, the model apparatus 10 may have access to label data for a large geographic area and will access label data for a more specific geographic area (e.g., as instructed by a user through a user interface 18 of the model apparatus 10).

At block 520, a plurality of training images are accessed. For example, the model apparatus 10 may access a plurality of training images. Similarly to accessing the label data, accessing a plurality of training images may involve at least a memory 14, a communication interface 16, and/or a user interface 18 of a model apparatus 10. For example, the model apparatus may comprise means, such as processor 12, memory 14, communication interface 16, user interface 18, and/or the like, for accessing training images. Each training image of the plurality of training images may be an image of the same geographic area corresponding to the label data accessed in block 510. In an example embodiment, each training image of the plurality of training images may be an image corresponding to only a section and/or portion of the geographic area of interest. In various example embodiments, each training image may be a satellite captured image of at least a portion of the same geographic area. Due to imperfections in satellite imagery, the image quality of each training image may be less than ideal. For example, various features within the geographic area may be captured in the image as blurry and/or fuzzy representations and may be misaligned and/or mispositioned (e.g., due to perspective effects and/or the like).

At block 530, the accessed label data and the accessed plurality of training images are provided to the input layer of the training model 20 of the model apparatus 10. For example, the model apparatus 10 may provide the label data and the plurality of training images to the training model 20. For example, the model apparatus 10 may comprise means, such as processor 12, memory 14, communication interface 16, and/or the like for providing the label data and the plurality of images to the training model 20. In certain embodiments, the training model 20 may implement machine learning and may also comprise of and/or be a neural network, with the input layer simply being the layer where the training model 20 receives its initial data. In various embodiments, the accessed label data and the accessed plurality of training images may be passed to the input layer of the training model 20 via a bus and/or other processing circuity configured to pass information within the model apparatus 10.

Reference is now made to FIG. 6A, which illustrates a method 600 performed by the predictor model 22 within the training model 20 following block 530. At block 610, the predictor model 22 receives via its input layer at least one training image of the plurality of training images. Similar to the input layer of the training model 20, the input layer of the predictor model 22 is the layer where it may receive its initial data before passing it onto other hidden layers. In various embodiments, the predictor model 22 receives all of the plurality of training images at the same time. In other example embodiments, the predictor model 22 may receive one training image at a time, and the method of at least FIG. 6A may be iteratively executed for each training image. In various example embodiments, the input layer of the predictor model 22 may be pipelined to and/or configured to receive information/data directly from the input layer of the training model 20 where the label data and the plurality of training image are provided in block 530. In other example embodiments, the training model 20 may comprise of at least the predictor model 22 as illustrated in FIG. 2B, and the input layer of the training model 20 may simply also be the input layer of the predictor model 22. For example, the predictor model 22 operating on and/or executed by the model apparatus 10 may receive at least one training image. For example, the model apparatus 10 may comprise means, such as processor 12, memory 14, and/or the like, for providing at least one training image to the predictor model 22.

At block 620, the predictor model 22 determines at least one prediction corresponding to the at least one training image. The at least one prediction determined may be a segmentation prediction 310 as described in FIGS. 3 and 4. For example, FIG. 4 illustrates a prediction 310 being a segmentation prediction, with a segmentation prediction image 400 comprising of segmentation predictions 310A-C. As discussed previously, these segmentation predictions 310 may be attempts to isolate, identify, label, and/or segment specific features in the geographic area corresponding to the label data and the training image. The at least one determined prediction may be a probability map and/or an edge image. For example, the predictor model 22 may attempt to segment all the buildings in a training image of a geographic area. It may be understood here that the predictor model 22 may implement any number or variety of image segmentation and/or classification techniques for the purposes of segmenting and/or classifying objects and boundaries in the at least one training image. Additionally, it may be understood that in example embodiments where the predictor model 22 may implement machine learning and/or neural networking, the determining of at least one prediction may be done in any number of hidden layers. In an example embodiment, the predictor model 22 may be and/or implement a residual network (ResNet) that determines at least one prediction corresponding to the at least one training image. In an example embodiment, the predictor model 22 may be and/or implement a 34-layer residual network (ResNet 34) that determines at least one prediction corresponding to the at least one training image. In another example, the predictor model 22 may be and/or implement a fully convolution network (FCN) that determines at least one prediction corresponding to the at least one training image. For example, the predictor model 22 operating on and/or executed by the model apparatus 10 may generate at least one prediction corresponding to the at least one training image. For example, the model apparatus 10 may comprise means, such as processor 12, memory 14, and/or the like, for generating at least one prediction corresponding to the at least one training image using the predictor model 22.

At block 630, the predictor model 22 provides the at least one prediction determined in block 620 via its output layer.

In various embodiments where the predictor model 22 implements machine learning and/or neural networking, the output layer may be a layer that produces a result or output based on the given initial data, the initial data being at least one training image received by the input layer at block 610. By providing the at least one prediction via the output layer, the predictor model 22 may allow the at least one prediction to be accessible by other modules and/or components of the training model 20 or the model apparatus 10. As mentioned previously, the at least one prediction may be a segmentation prediction, such as a segmentation prediction image 400 for example, and may be in the form of a probability map and/or edge image. For example, the predictor model 22 operating on and/or executed by the model apparatus 10 may provide the at least one prediction. For example, the model apparatus 10 may comprise means, such as processor 12, memory 14, and/or the like, for providing the at least one prediction via the output layer of the predictor model 22.

Reference is now made to FIG. 6B, which illustrates a method 650 performed by the alignment model 24. The method 650 may be performed following the conclusion of method 600. At block 660, the alignment model 24 receives the label data and the at least one prediction via its input layer. The label data provided here may be at least a portion of the same label data provided to the input layer of the training model in block 530. In various embodiments, the input layer of the alignment model 24 may be pipelined and/or configured to receive the label data directly from the input layer of the training model 20. In other example embodiments, the training model 20 may comprise of at least the alignment model 24 as illustrated in FIG. 2B, and the input layer of the training model 20 may be the input layer of the alignment model 24. The at least one prediction provided here at block 660 may be the same at least one prediction provided by the predictor model 22 via its output layer in block 630. In various embodiments, the alignment model may be configured to receive data from the predictor model, specifically via the predictor model output layer and the alignment model input layer. For example, the alignment model 24 operating on and/or executed by the model apparatus 10 may receive the at least one prediction and at least a portion of the label data. For example, the model apparatus 10 may comprise means, such as processor 12, memory 14, and/or the like, for receiving the at least one prediction and at least a portion of the label data at the alignment model 24.

At block 670, the alignment model 24 transforms the at least one prediction to align with label data. As shown in FIG. 2B and FIG. 3, the alignment model 24 may employ a spatial transformer network to perform the transformation of the at least one prediction. The previous detailed discussion of FIG. 3 describes how a transformation of at least one prediction is determined based on at least the label data and how a transformed/modified prediction is generated as a result of the transformation. For example, the alignment model 24 operating on and/or executed by the model apparatus 10 may transform the at least one prediction based at least in part on the label data. For example, the model apparatus 10 may comprise means, such as processor 12, memory 14, and/or the like, for transforming the at least one prediction based at least in part on the label data via the alignment model 24.

At block 680, the alignment model 24 then provides the transformed prediction via its output layer. By providing the transformed prediction via the output layer, the alignment model 24 may allow the transformed prediction to be accessible by other modules and/or components of the training model 20 or the model apparatus 10. For example, the user interface 18 of the model apparatus 10 may retrieve the transformed prediction from the alignment model output layer and display it for a user to optionally review, further modify, and/or approve. For example, the alignment model 24 operating on and/or executed by the model apparatus 10 may provide the transformed prediction. For example, the model apparatus 10 may comprise means, such as processor 12, memory 14, communication interface 16, user interface 18, and/or the like, for providing the transformed prediction.

Returning to FIG. 5, the loss engine of the training model 20 is executed iteratively at block 540. In various embodiments, the loss engine is configured to evaluate a difference, or "loss", between the label data and the plurality of training images. In other words, the loss engine is configured to determine the accuracy of the transformed prediction with respect to the original label data. For example, the model apparatus 10 may evaluate a loss function based at least in part on the transformed prediction and the label data. For example, the model apparatus 10 may comprise means, such as processor 12, memory 14, and/or the like for evaluating a loss function based at least in part on the transformed prediction and the label data.

Reference is now made to FIG. 7, which illustrates an example embodiment of a method by which the loss engine 28 of the training model 20 is iteratively executed at block 540. At block 542, the loss engine 28 receives the label data and the transformed prediction. The transformed prediction may be received via the alignment model 24 output layer. The label data may also be received via the alignment model 24 output layer, or it may be received directly from the training model 20 input layer where the label data was initially provided in block 530. In various example embodiments, the loss engine 28 may comprise of and/or be a number of layers. For example, the loss engine 28 may comprise of an input layer that receives the label data and the transformed prediction, any number of hidden layers, and an output layer. For example, the loss engine 28 operating on and/or executed by the model apparatus 10 may receive the transformed prediction and at least a portion of the label data. For example, the model apparatus 10 may comprise means, such as processor 12, memory 14, communications interface 16, user interface 18, and/or the like for causing the loss engine 28 to receive the transformed prediction and at least a portion of the label data.

At block 544, the loss engine 28 evaluates a loss function. The loss function may take as inputs at least the label data and the transformed prediction and determine a quantitative measurement of the differences between the label data and the transformed prediction. Due to the alignment model 24 transforming the original prediction by the predictor model 22 based on the label data, the difference between the label data and the transformed prediction may be less than the difference between the label data and the original prediction (or a prediction by a predictor model 22 not trained by an alignment model 24). For example, the loss function evaluated in the loss engine 28 and evaluated throughout the training model 20 may be a pixel-wise cross entropy loss function (Per-Pixel CrossEnt). For example, the loss engine 28 operating on and/or executed by the model apparatus 10 may evaluate the loss function based at least in part on the transformed prediction and at least a portion of the label data. For example, the model apparatus 10 may comprise means, such as processor 12, memory 14, and/or the like, for causing the loss engine 28 to evaluate the loss function based at least in part on the transformed prediction and at least a portion of the label data.

At block 546, the loss engine 28 causes weights and/or parameters of the predictor model 22 and the alignment model 24 to be updated based on the evaluated loss function. For example, the loss engine 28 operating on and/or executed iteratively by the model apparatus 10 may cause weights and/or parameters of the predictor model to be updated based at least in part on the evaluated loss function. For example, the model apparatus 10 may comprise means, such as processor 12, memory 14, and/or the like for causing weights and/or parameters of the predictor model to be updated based at least in part on the evaluated loss function. The updating of these weights and/or parameters may cause the predictor model 22 and the alignment model 24 to be trained. These weights and/or parameters may be factors in the methods and operations executed by both the predictor model 22 and the alignment model 24. For example, the loss engine 28 may update some weights that the alignment model 24 uses to transform a prediction to align to the label data. In example embodiments, the method 500 may operate iteratively in a standard machine learning fashion, thus the loss engine 28 may update these weights and/or parameters multiple times to progressively train the predictor model 22 and the alignment model 24. Additionally, modified predictions at the end of the method 500 that may be considered optimized and/or fully aligned by the loss function may be further used as label data in future applications of the method 500. When the predictor model 22 is considered to be fully trained, the predictor model 22 may be used independently of the alignment model 24.

Once the predictor model 22 has been trained, the predictor model 22 may be used independent of the alignment model 24 to generate predictions for images. For example, after the predictor model 22 and alignment model 24 have been trained such that the evaluation of the loss function indicates an appropriate level of convergence of the weights and/or parameters of the predictor model 22 and the alignment model 24, the predictor model 22 may be used to generate predictions for images. For example, the predictor model 22 may be used to perform segmentation processes for images for which label data may or may not be available.

III. Technical Advantages

Technical advantages of the present disclosure may be seen in FIGS. 8A and 8B. FIG. 8A illustrates an example of a segmentation prediction resulting from the predictor model 22 not trained in parallel with an alignment model 24 and its spatial transformer network 26. As can be seen, the segmentation boundaries in FIG. 8A are not particularly clear and may be considered to be substantially blurry and/or fuzzy. These segmentation imperfections in general may arise due to some imaging from another satellite source being used for labeling. Problems may also arise with a map data annotator being sloppy or not requiring pixel-accurate labels for efficiency. Unclear segmentation boundaries such as the ones shown in FIG. 8A present a technical problem in that there would be margins of error in applications that may rely on accurate geographical mapping or images. For example, an in-car navigation system that might rely on segmentation of satellite images to perform localization functions, for example, would need to be able to accurately determine where features in the geographic area are to prevent collisions and accidents.

Now referring to FIG. 8B, an example of a segmentation prediction resulting from the predictor model 22 being trained in parallel with the alignment model 24 and its spatial transformer network 26 is provided. The segmentation predictions shown in both FIGS. 8A and 8B are determined from the same original image. The segmentation prediction shown in FIG. 8B, however, provides much clearer segmentation boundaries compared to the segmentation boundaries shown in FIG. 8A. This obvious improvement shown in FIG. 8B highlights the advantages of the implementation of the present disclosure. The present disclosure provides a technical solution to the technical problem illustrated by FIG. 8A, thus allowing the use of larger existing geospatial data sets that may not contain the original well-aligned imagery, better computational efficiency than optimization-based approaches used to correct misalignment between training image features and label data, and higher labeling accuracy in general due to training loss optimization. Furthermore, the present disclosure may be easily applicable to new and unforeseen problems.

IV. Example Apparatus

The model apparatus 10 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, server, server system, a personal computer, a computer workstation, a laptop computer, a plurality of networked computing devices or the like, that are configured to train a predictor network. In this regard, FIG. 2A depicts a model apparatus 10 of an example embodiment that may be embodied by various computing devices including those identified above. As shown, the model apparatus 10 of an example embodiment may include, may be associated with or may otherwise be in communication with a processor 12 and a memory device 14 and optionally a communication interface 16 and/or a user interface 18. In an example embodiment, the model apparatus 10 may comprise a predictor model (e.g., segmentation model). For example, the predictor model may be trained deep net and/or neural network. For example, network weights and/or parameters for the predictor model may be determined through a machine learning process of an example embodiment.

In some embodiments, the processor 12 (and/or co-processors or any other processing circuitry assisting or otherwise associated with the processor) may be in communication with the memory device 14 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

As described above, the model apparatus 10 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. For example, the processor 22 may be configured to execute a machine learning process to train a predictor network. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

In some embodiments, the model apparatus 10 may include a user interface 18 that may, in turn, be in communication with the processor 12 to provide output to the user, such as results of analyzing an image and/or point cloud using a predictor model, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, and/or the like).

The model apparatus 10 may optionally include a communication interface 16. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the model apparatus 10 of an example embodiment, a navigation system may also include or have access to a geographic database that includes a variety of data (e.g., map information/data) utilized in constructing a route or navigation path, determining the time to traverse the route or navigation path, and/or other navigation functions. In an example embodiment, the geographic database stored map information/data of a three-dimensional and/or 2.5-dimensional map. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In an example embodiment, the data records (e.g., node data records, link data records, POI data records, and/or other data records) may comprise computer-executable instructions, a reference to a function repository that comprises computer-executable instructions, one or more coefficients and/or parameters to be used in accordance with an algorithm for performing the analysis, one or more response criteria for providing a response indicating a result of the analysis, and/or the like. In at least some example embodiments, the mobile apparatus 20 may be configured to execute computer-executable instructions provided by and/or referred to by a data record. In an example embodiment, the model apparatus 10 may be configured to modify, update, and/or the like one or more data records of the geographic database.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

In an example embodiment, static feature information/data is stored in association with the map information/data. For example, the geographic database may further comprise a database, library, and/or the like of static feature information/data that is stored in association with the map information/data. For example, in some embodiments, static feature information/data corresponding to static features located within a particular map tile is stored as part of (e.g., as a layer, associated map information/data, and/or the like) of the particular map tile. In an example embodiment, the static feature information/data is three-dimensional information/data. For example, the static feature information/data comprises information/data respectively describing one or more features (e.g., size, shape, color, texture, reflectance, and/or the like of the feature) and the position and orientation of the respective features. In an example embodiment, the static feature information/data is part of the three-dimensional model of the geographic area. In an example embodiment, at least a portion of the static feature information/data is used as label data (e.g., label data 330 ground truth) for training the predictor model 22.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be updated based on information/data provided by one or more mobile apparatuses.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 in accordance with an example embodiment may determine the time to traverse a route that includes one or more turns at respective intersections more accurately.

V. Apparatus, Methods, and Computer Program Products

As described above, FIGS. 5, 6A, 6B, and 7 illustrate flowcharts of apparatuses 10, method, and computer program product according to an example embodiment of the disclosure. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14 of an apparatus employing an embodiment of the present disclosure and executed by the processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosure set forth herein will come to mind to one skilled in the art to which the disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for training a predictor model, the method comprising:
    accessing, by a model apparatus, label data stored in computer-readable memory and corresponding to a geographic area;
    accessing, by the model apparatus, a plurality of training images corresponding to at least a portion of the geographic area;
    providing, by the model apparatus, the label data and the plurality of training images to a training model that comprises of at least a predictor model and an alignment model, wherein (a) the predictor model is configured to receive at least one image of the plurality of training images and output at least one prediction based at least in part on the at least one image, and (b) the alignment model is configured to generate a transformed prediction based at least in part on the at least one prediction and the label data; and
    causing a loss engine, by the model apparatus, to iteratively:
        receive the label data and the transformed prediction from the alignment model,
        evaluate a loss function based at least in part on the label data and the transformed prediction, and
        cause weights of the predictor model and the alignment model to be updated based on the evaluated loss function to cause the predictor model and the alignment model to be trained.

2. The method of claim 1, wherein the predictor model is a segmentation model.

3. The method of claim 1, wherein the predictor model is at least one of (a) a residual network (ResNet) or (b) fully convolution network (FCN).

4. The method of claim 1, wherein the predictor model is a 34-layer residual network.

5. The method of claim 1, wherein the label data is at least one of (a) map data, (b) building footprints associated with a ground truth location, or (c) a two-dimensional or three-dimensional model of a geographic area.

6. The method of claim 1, wherein the alignment model is a spatial transformer network.

7. The method of claim 1, wherein, after completion of training, the predictor model is used independently of the alignment model.

8. The method of claim 1, wherein the alignment model transforms the prediction using at least one of translation, rotation, an affine transformation, a projective transformation, a dense pixel transformation, or a scaling transformation.

9. The method of claim 1, wherein the prediction is at least one of a probability map or an edge image.

10. An apparatus comprising at least one processor and at least one memory storing computer program code, the at least one memory and the computer program code are configured to, with the processor, cause the apparatus to at least:
    access label data stored in computer-readable memory and corresponding to a geographic area;
    access a plurality of training images corresponding to at least a portion of the geographic area;
    provide the label data and the plurality of training images to a training model that comprises of at least a predictor model and an alignment model, wherein (a) the predictor model is configured to receive at least one image of the plurality of training images and output at least one prediction based at least in part on the at least one image, and (b) the alignment model is configured to generate a transformed prediction based at least in part on the at least one prediction and the label data; and
    cause a loss engine to iteratively:
        receive the label data and the transformed prediction from the alignment model,
        evaluate a loss function based at least in part on the label data and the transformed prediction, and
        cause weights of the predictor model and the alignment model to be updated based on the evaluated loss function to cause the predictor model and the alignment model to be trained.

11. The apparatus of claim 10, wherein the predictor model is a segmentation model.

12. The apparatus of claim 10, wherein the predictor model is at least one of (a) a residual network (ResNet) or (b) fully convolution network (FCN).

13. The apparatus of claim 10, wherein the predictor model is a 34-layer residual network.

14. The apparatus of claim 10, wherein the label data is at least one of (a) map data, (b) building footprints associated with a ground truth location, or (c) a two-dimensional or three-dimensional model of a geographic area.

15. The apparatus of claim 10, wherein the alignment model is a spatial transformer network.

16. The apparatus of claim 10, wherein, after completion of training, the predictor model is used independently of the alignment model.

17. The apparatus of claim 10, wherein the alignment model transforms the prediction using at least one of translation, rotation, an affine transformation, a projective transformation, a dense pixel transformation, or a scaling transformation.

18. The apparatus of claim 10, wherein the prediction is at least one of a probability map or an edge image.

19. A computer program product comprising at least one non-transitory computer-readable storage medium having computer-executable program code instructions stored therein, the computer-executable program code instructions comprise program code instructions configured to, when executed by a processor of an apparatus, cause the apparatus to:

access label data stored in computer-readable memory and corresponding to a geographic area;

access a plurality of training images corresponding to at least a portion of the geographic area;

provide the label data and the plurality of training images to a training model that comprises of at least a predictor model and an alignment model, wherein (a) the predictor model is configured to receive at least one image of the plurality of training images and output at least one prediction based at least in part on the at least one image, and (b) the alignment model is configured to generate a transformed prediction based at least in part on the at least one prediction and the label data; and cause a loss engine to iteratively:

receive the label data and the transformed prediction from the alignment model, evaluate a loss function based at least in part on the label data and the transformed prediction, and cause weights of the predictor model and the alignment model to be updated based on the evaluated loss function to cause the predictor model and the alignment model to be trained.

20. The computer program product of claim 19, wherein the predictor model is a segmentation model.

* * * * *